United States Patent
Kuribayashi et al.

(10) Patent No.: US 6,188,420 B1
(45) Date of Patent: Feb. 13, 2001

(54) IMAGE FORMING APPARATUS

(75) Inventors: Masaki Kuribayashi, Inagi; Noboru Koumura, Shizuoka-ken; Yukio Nagase, Shizuoka-ken; Izumi Narita, Shizuoka-ken; Seiji Mashimo, Tokyo, all of (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 09/217,125

(22) Filed: Dec. 21, 1998

(30) Foreign Application Priority Data

Jan. 5, 1998 (JP) .................................................. 10-000204

(51) Int. Cl.⁷ ..................................................... B41J 2/385
(52) U.S. Cl. ............................................. 347/132; 347/237
(58) Field of Search .................................... 347/132, 237, 347/130, 247, 240; 430/64; 235/455; 355/208; 313/506

(56) References Cited

U.S. PATENT DOCUMENTS

| | | | |
|---|---|---|---|
| 4,265,991 | * 5/1981 | Hirai et al. | 430/64 |
| 4,356,429 | 10/1982 | Tang | 313/503 |
| 4,539,507 | 9/1985 | Van Slyke et al. | 313/504 |
| 4,720,432 | 1/1988 | Van Slyke et al. | 428/457 |
| 4,769,292 | 9/1988 | Tang et al. | 428/690 |
| 4,885,211 | 12/1989 | Tang et al. | 428/457 |
| 4,950,950 | 8/1990 | Perry et al. | 313/504 |
| 5,047,687 | 9/1991 | Van Slyke | 313/503 |
| 5,059,861 | 10/1991 | Littman et al. | 313/503 |
| 5,059,862 | 10/1991 | Van Slyke et al. | 313/503 |
| 5,061,617 | 10/1991 | Maskasky | 430/569 |
| 5,073,446 | 12/1991 | Scozzafava et al. | 428/323 |
| 5,151,629 | 9/1992 | Van Slyke | 313/504 |
| 5,294,869 | 3/1994 | Tang et al. | 313/504 |
| 5,294,870 | 3/1994 | Tang et al. | 313/504 |
| 5,382,782 | * 1/1995 | Hasegawa et al. | 235/455 |
| 5,714,838 | * 2/1998 | Haight et al. | 313/506 |
| 5,818,501 | * 10/1998 | Ng et al. | 347/240 |
| 5,892,532 | * 4/1999 | Katakura et al. | 347/240 |

FOREIGN PATENT DOCUMENTS 349265   1/1990   (EP) .

\* cited by examiner

Primary Examiner—N. Le
Assistant Examiner—Lamson D. Nguyen
(74) Attorney, Agent, or Firm—Fitzpatrick, Cella, Harper & Scinto

(57) ABSTRACT

The exposure device of an image forming apparatus includes a light-emitting device array having light-emitting devices; a switching device array including switching devices connected to the light-emitting devices, the switching device array being divided into a plurality of groups; a first line group for connecting commonly to first terminals of switching devices of each of the groups; a second line group for connecting commonly to second terminals of switching devices of each of the groups; and a circuit for performing simultaneous light emission of the light-emitting device array to expose the photosensitive member.

9 Claims, 9 Drawing Sheets

IMAGE FORMING APPARATUS

BACKGROUND OF THE INVENTION

1. Field of the Invention

The present invention relates to image forming apparatuses such as electrophotographic copying machines. Specifically, the present invention relates to an image forming apparatus including an array of photosensitive members that independently form a cyan image, a magenta image, a yellow image, and a black image, and thus form a color image as a result of a combination of these primary images.

2. Description of the Related Art

A known laser image forming apparatus for forming a color image has four arrays of electrophotographic photosensitive members and corresponding laser light sources as image exposure means. Oscillation of four laser light sources is controlled based on cyan, magenta, yellow and black image signals from an image to form four electrostatic latent images on the corresponding electrophotographic photosensitive members. These electrostatic latent images are developed and recombined to form the color image.

Laser beams from four laser light sources must be scanned so that four scanning beams are synchronized in the main and sub directions and thus cyan, magenta, yellow and black images are precisely recombined to form a color image free from color offset. It is, however, difficult to synchronize scanning of the four laser beams in the main and sub directions.

Another type of known color image forming apparatus has four electrophotographic photosensitive members and four LED light sources for forming cyan, magenta, yellow and black electrostatic latent images, in place of the laser light sources. In this apparatus, four scanning beams are relatively readily synchronized. On the other hand, a plurality of expensive LED chips are rearranged into four LED arrays in the apparatus (each LED array is referred to as a combined LED device), resulting in increased production costs of the apparatus. Since individual LED chips have different light emission characteristics, exposition by a combined LED device differs in the main scanning direction. Thus, image reproducibility is unsatisfactory in the main scanning direction.

In the color electrophotographic-copying machine, a combined LED device must be arranged for each of four electrophotographic photosensitive members. Since four combined LED devices also have different light emission characteristics as described above, it is even more difficult to precisely reproduce the original image.

SUMMARY OF THE INVENTION

Accordingly, it is an object of the present invention to provide an image forming apparatus, such as an electrophotographic copying machine, using combined LED devices as an exposure unit free from irregular light emission characteristics in the main scanning direction.

It is another object of the present invention to provide an image forming apparatus using combined LED devices that show significantly high luminance.

It is still another object of the present invention to provide an image forming apparatus in which driving lines and driving chips in a printer head are significantly decreased.

It is a further object of the present invention to provide an image forming apparatus having a significantly high process speed of electrophotographic copying.

A first aspect of the present invention is an image forming apparatus comprising a photosensitive member and an exposure means. The exposure means comprises a light-emitting device array including a plurality of light-emitting devices arranged in the main scanning direction to the moving direction of the photosensitive member; a switching device array including a plurality of switching devices connected to the light-emitting devices, said switching device array being divided into a plurality of groups; a first line group for connecting commonly to first terminals of switching devices of each of the groups; a second line group for connecting commonly to second terminals of switching devices of each of the groups; and a circuit for performing simultaneous light emission of said light-emitting device array to expose the photosensitive member.

A second aspect of the present invention is an image forming apparatus comprising a photosensitive member and an exposure means. The exposure means comprises a light-emitting device array including a plurality of light-emitting devices arranged in the main scanning direction to the moving direction of the photosensitive member; a switching device array including a plurality of switching devices connected to the light-emitting devices, the switching device array being divided into a plurality of groups; a first line group for connecting commonly to first terminals of switching devices of each of the groups a second line group for connecting commonly to second terminals of switching devices of each of the groups; and sample-and-hold circuits each being connected to each of the switching devices for performing simultaneously light emission of the light-emitting device array by simultaneous discharging of the charge held in the sample-and-hold circuits to expose the photosensitive member.

A third aspect of the present invention is an image forming apparatus comprising a photosensitive member and an exposure means. The exposure means comprises a light-emitting device array including a plurality of light-emitting devices arranged in the main scanning direction to the moving direction of the photosensitive member; a switching device array including a plurality of switching devices connected to the light-emitting devices, the switching device array being divided into a plurality of groups; a first line group for connecting commonly to first terminals of switching devices of each of the groups; a second line group for connecting commonly to second terminals of switching devices of each of the groups; and a plurality of light-emitting device array blocks having circuits for performing simultaneous light emission of the light-emitting device array; and a driving means for performing simultaneous light emission of one light-emitting device array block and for operating sequentially the plurality of light-emitting device array blocks.

Preferably, the light-emitting device has an organic light-emitting layer.

Preferably, photosensitive member is an electrophotographic photosensitive member. The electrophotographic photosensitive member may be an organic electrophotographic photosensitive member. Alternatively, electrophotographic photosensitive member may be an inorganic electrophotographic photosensitive member. Preferably, the inorganic electrophotographic photosensitive member comprises amorphous silicon.

The switching devices are preferably thin film transistors, wherein the first terminal is a gate terminal and the second terminal is a source terminal.

Preferably, the switching device array is formed into one chip.

The one-chip light-emitting device contributes to cost reduction of the light-emitting array section in an image forming apparatus and high color reproducibility in the main scanning direction. One-chip light-emitting device arrays made of a single substrate show substantially equal light-emitting characteristics and thus do not require calibration between these light-emitting device arrays.

The light-emitting device has significantly high luminance; hence the process speed of an electrophotographic copying machine using the light-emitting device is significantly increased. Further, the number of the driver ICs and the number of the wiring lines in the printer head are significantly decreased. Accordingly, the color copying machine can be produced with reduced material and production costs.

Further objects, features and advantages of the present invention will become apparent from the following description of the preferred embodiments with reference to the attached drawings.

DESCRIPTION OF THE PREFERRED EMBODIMENTS

Figure 1:
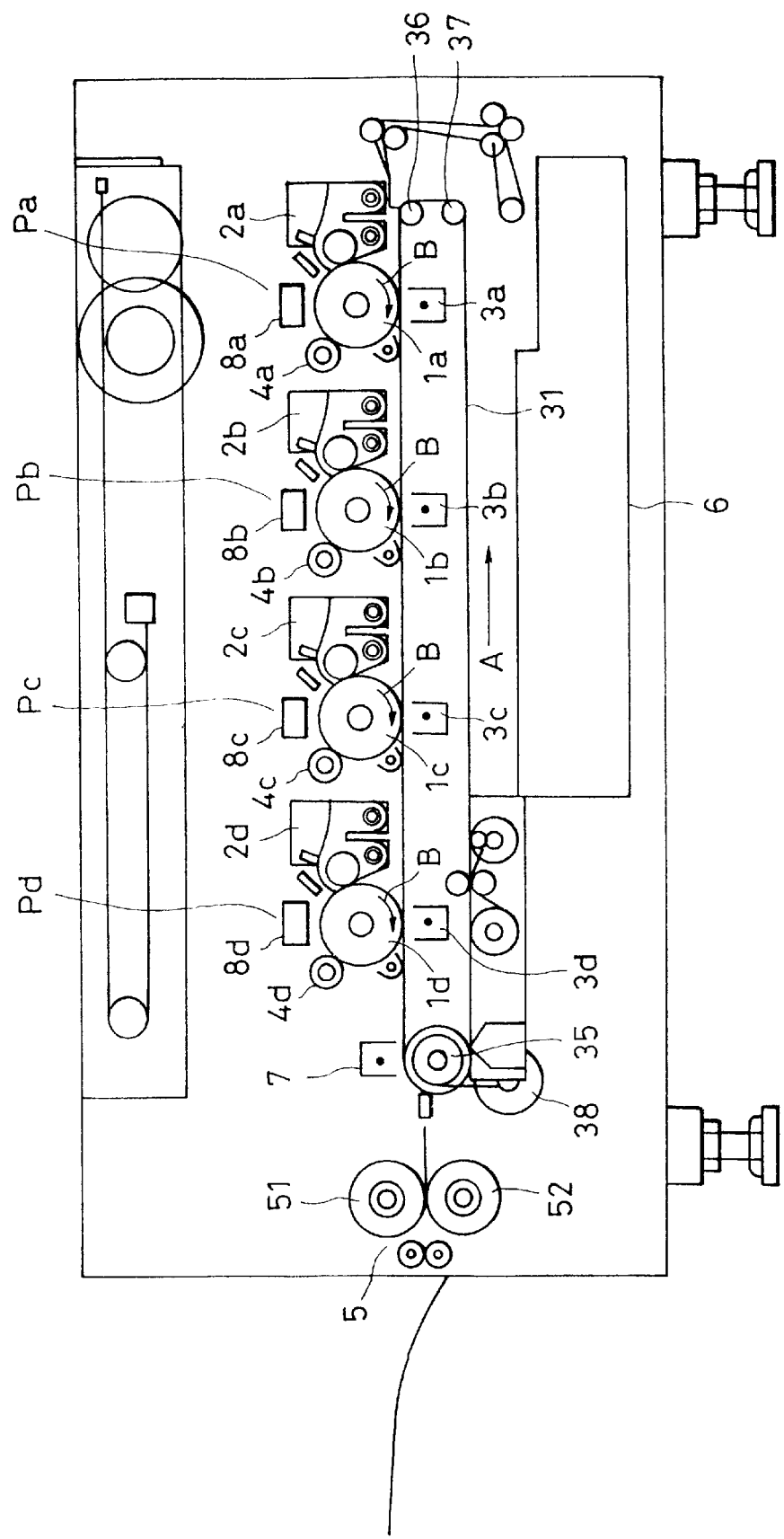
FIG. 1 is a cross-sectional view of an image forming apparatus in accordance with the present invention.

The present invention will now be described in detail with reference to the attached drawings. FIG. 1 is a cross-sectional view of a color electrophotographic-copying machine as an embodiment of an image forming apparatus in accordance with the present invention. Printing media such as paper are stored in a cassette 6, and fed to a paper transfer section through a driving section in cooperation with the image-forming or printing operation. The paper transfer section comprises a transfer belt 31, a driving roller 35, and two sub rollers 36 and 37, the transfer belt 31 lying over the driving roller 35 and the sub rollers 36 and 37. A motor 38 drives the driving roller 35 so that the transfer belt 31 moves on the driving roller 35 and the sub rollers 36 and 37 in the direction of the arrow A.

Four image-forming units Pa, Pb, Pc, and Pd are arranged above the transfer belt 31. Since these units Pa, Pb, Pc, and Pd have the same configuration, only the configuration of the unit Pa for forming a first color will now be described. The image-forming unit Pa has a cylindrical photosensitive member or photosensitive drum 1a rotating near the transfer belt 31 in the direction of the arrow B. Driving rotation, a primary charger 4a, which is a contact-type charger, uniformly electrifies the photosensitive layer on the photosensitive drum 1a. An exposure means 8a of the one-chip light-emitting device array emits light over the entire main scanning region of the photosensitive drum 1a to form a yellow electrostatic latent-image component of a document image on the photosensitive drum 1a. The yellow latent-image component is developed to a visual yellow toner image with a yellow toner supplied from a yellow developer 2a.

By the rotation of the photosensitive drum 1a, the yellow toner image moves to an image transfer section having a corona charger 3a that is provided at the reverse side of the transfer belt 31, while the printing medium is synchronously transferred to the image transfer section by the transfer belt 31. A transfer bias is applied to the corona charger 3a to continuously transfer the yellow toner image on the rotating photosensitive drum 1a onto the printing medium.

Next, a cleaning unit (not shown in the drawing) removes the residual toner on the rotating photosensitive drum 1a for the next image formation. The printing material with the yellow toner image is transferred to the next printing section including a second image-forming unit Pb by the transfer belt 31.

As described above, the second image-forming unit Pb has the same configuration as the first image-forming unit Pa. A magenta latent-image component is exposed by light from an exposure means 8b comprising a one-chip light-emitting device array, and is developed with a magenta toner. The magenta toner image is transferred onto the printing medium at the image transfer section so as to overlap with the first yellow toner image. In cooperation with movement of the printing image, a cyan latent-image component and a black latent-image component are exposed by light from exposure means 8c and 8d, respectively, each comprising a one-chip light-emitting device array, and are developed with a cyan toner and a black toner, respectively. The cyan and black toner images are transferred onto the printing medium so as to overlap with the yellow and magenta toner images. A color image comprising four overlapped toner images is thereby formed on the recording medium.

The second image-forming unit Pb has a photosensitive drum 1b, a magenta developer 2b, a corona charger 3b and a primary charger 4b being a contact charger; the third image-forming unit Pc has a photosensitive drum 1c, a cyan developer 2c, a corona charger 3c and a primary charger 4c being a contact charger; and the fourth image-forming unit Pd has a photosensitive drum 1d, a black developer 2d, a corona charger 3d and a primary charger 4d being a contact charger.

The printing medium having a four-color transferred toner image moves from the fourth image-forming unit Pd to a blanket discharging unit 7, where the recording medium is discharged and separated from the transfer belt 31 towards a fixing unit 5 having a fixing roller 51 and a pressure roller 52. These rollers 51 and 52 form a nip section that is heated to a given temperature, and the transferred toner image on the recording medium is fixed by pressure and heat at the nip section. The recording medium having the fixed color image is discharged from the copying machine.

Figure 2:
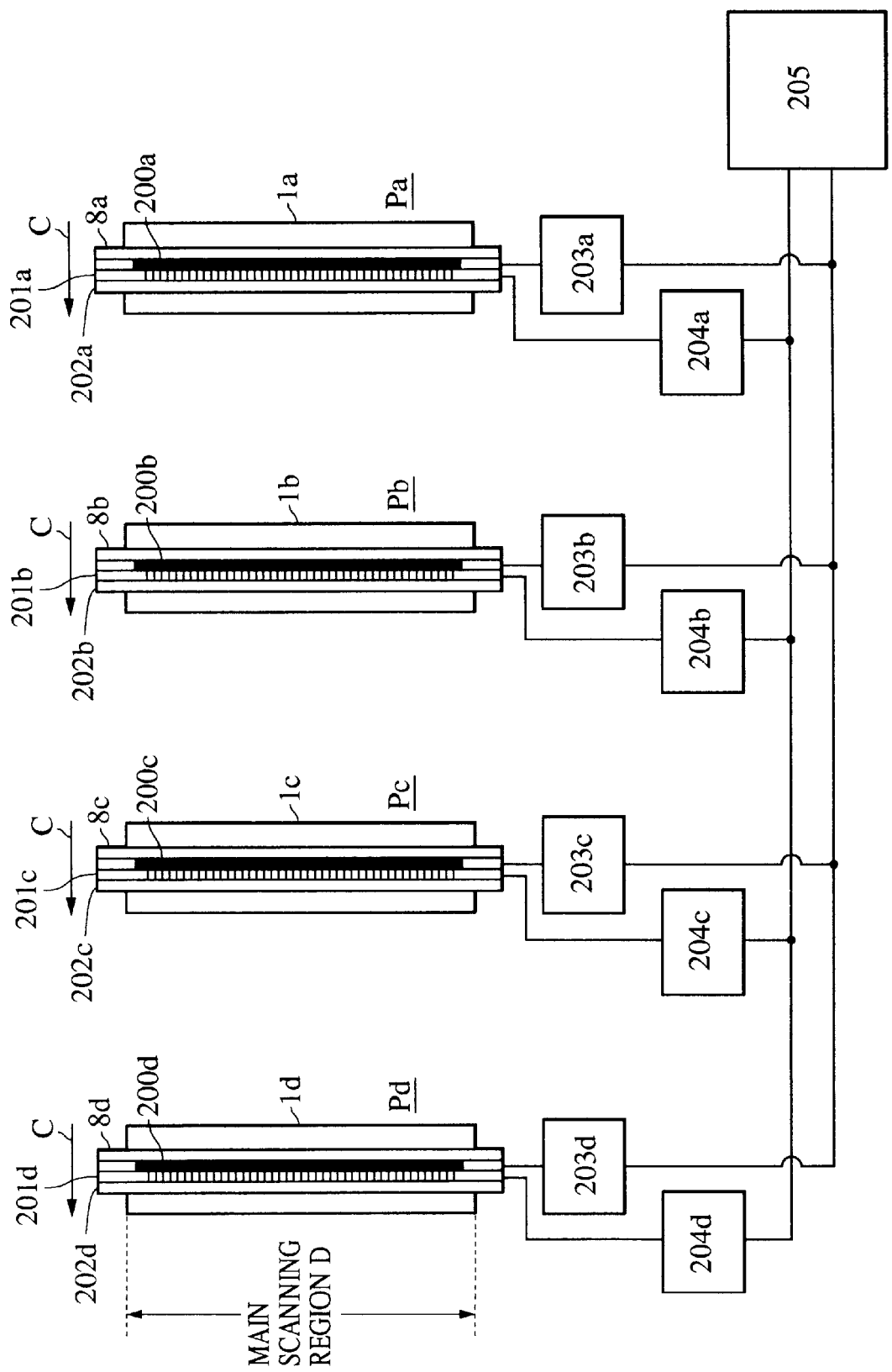
FIG. 2 is a block diagram of an exposure section used in an image forming apparatus in accordance with the present invention.

FIG. 2 is a block diagram of the image-forming units Pa, Pb, Pc, and Pd shown in FIG. 1. The exposure means 8a, 8b, 8c, and 8d of the image-forming units Pa, Pb, Pc, and Pd have a yellow light-emitting device array 200a, a magenta light-emitting device array 200b, a cyan light-emitting device array 200c, and a black light-emitting device array 200d, respectively. These yellow, magenta, cyan and black light-emitting device arrays 200a, 200b, 200c, and 200d are connected to a yellow signal-driving integrated circuit 202a, a magenta signal-driving integrated circuit 202b, a cyan signal-driving integrated circuit 202c, and a black signal-driving integrated circuit 202c, by lead sections 201a, 201b, 201c, and 201d, respectively. Each driving circuit controls the corresponding light-emitting device to either an emitting state or a quenching state, in response to image signals from the corresponding one of a yellow signal feeding circuit 204a, a magenta signal feeding circuit 204b, a cyan signal feeding circuit 204c, and a black signal feeding circuit 204d. The yellow, magenta, cyan and black light-emitting device arrays 200a, 200b, 200c, and 200d have a high resolution of, for example, 1,200 dpi.

Each of these light-emitting device arrays has a switching circuit and a sample-and-hold circuit. Yellow, magenta, cyan and black gate-driving circuits 203a, 203b, 203c, and 203d control driving of gate lines in these circuits. An image-processing unit 205 in a CPU (not shown in the drawing) comprehensively controls the driving operation of the gate lines and the yellow, magenta, cyan and black image signals.

Each of the yellow, magenta, cyan and black light-emitting device arrays 200 a, 200b, 200c, and 200d comprises one chip and is positioned so as to cover the entire main scanning region D with respect to the rotation of the photosensitive drums 1a, 1b, 1c, and 1d. It is preferable that the yellow, magenta, cyan and black light-emitting device arrays 200 a, 200b, 200c, and 200d be four chips formed on and cut from a single substrate.

The arrow C in the drawing indicates the sub scanning direction of the rotating photosensitive member. The photosensitive drums 1a, 1b, 1c, and 1d have the same diameter, for example, 60 cm, 30 cm or 20 cm, are made of an aluminum pipe, have a common photosensitive layer composed of an organic material or amorphous silicon, and have the same moving rate in the sub scanning direction C.

Figure 3:
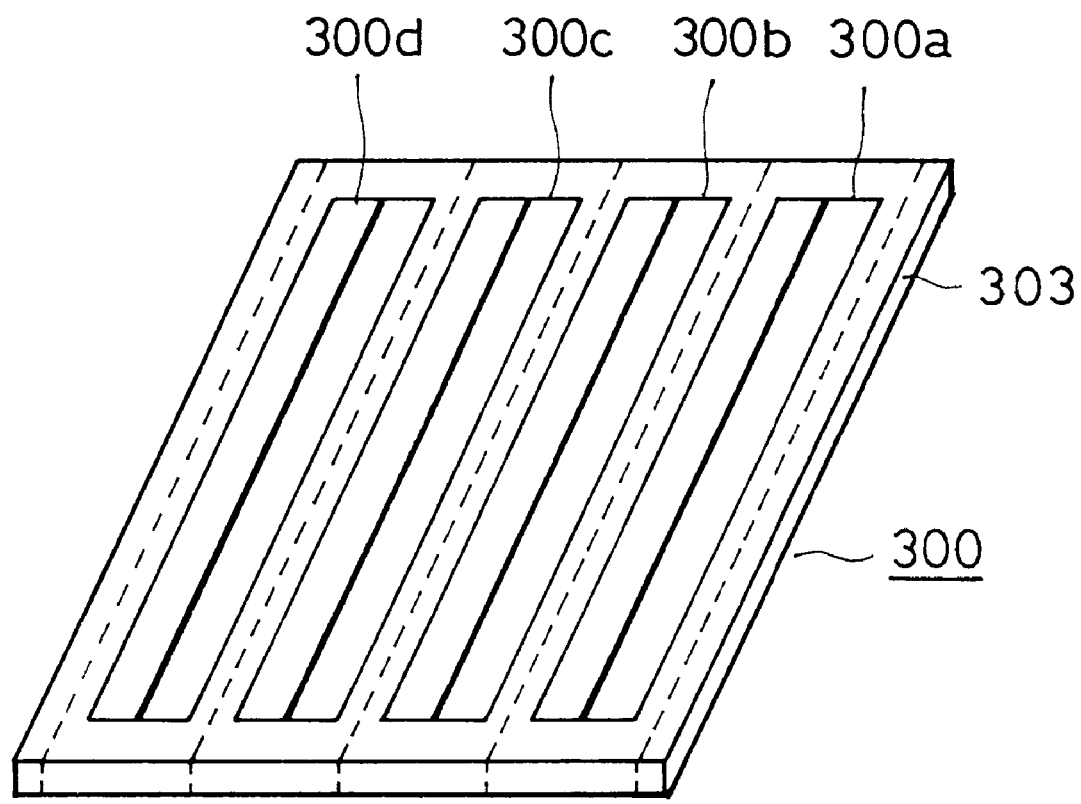
FIG. 3 is an isometric view of one-chip light-emitting device arrays on a single substrate in accordance with the present invention.

FIG. 3 is an isometric view of a one-chip light-emitting device array block 300 formed on a glass substrate 303. The array block 300 consists of a yellow light-emitting device array 300a, a magenta light-emitting device array 300b, a cyan light-emitting device array 300c, and a black light-emitting device array 300d, which are not yet to be cut. The size of the glass substrate 303 is not limited as long as these four light-emitting device arrays can be formed.

Figure 4:
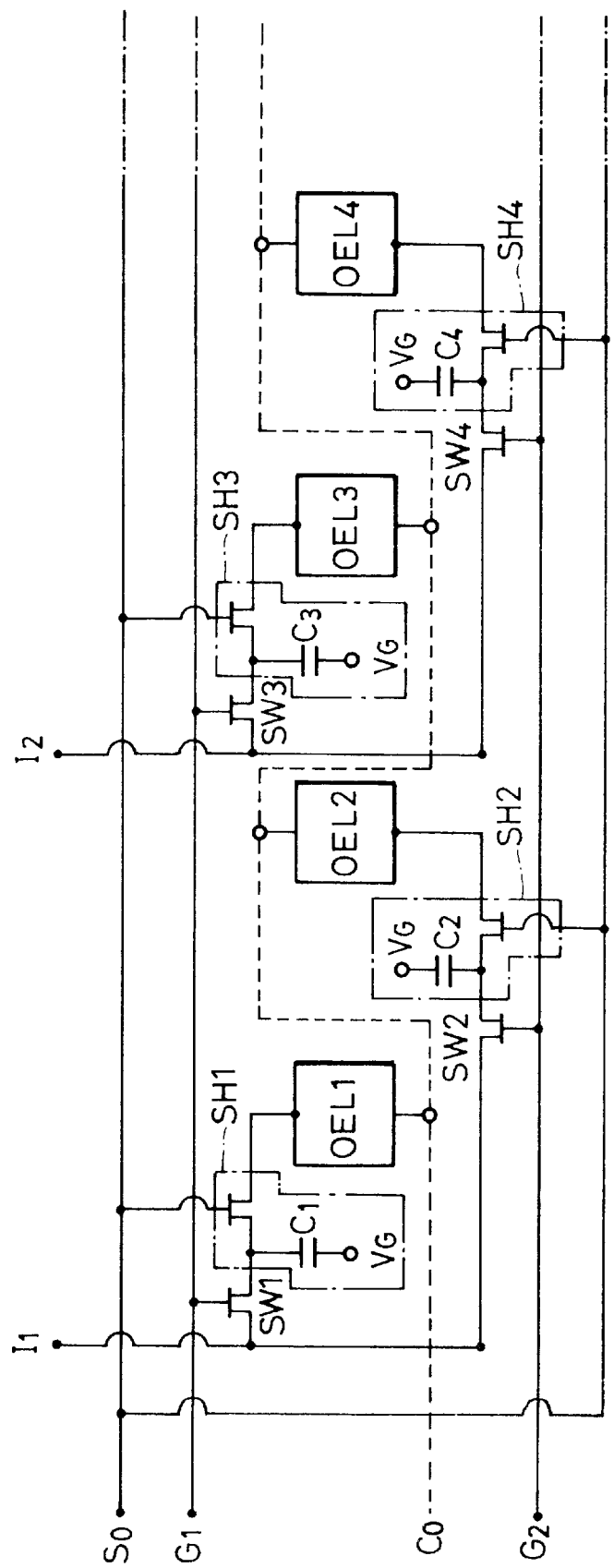
FIG. 4 is a cross-sectional view of a light-emitting device array in accordance with the present invention.

FIG. 4 is an equivalent circuit diagram of each of the one-chip light-emitting device arrays shown in FIG. 3. A plurality of light-emitting devices OEL1, OEL2, OEL3, OEL4 . . . OEL$_N$ are arranged in the main scanning direction with respect to the rotation direction of the photosensitive drum in an electrophotographic copying machine, and connected to corresponding active matrix circuits. In the active matrix circuits, thin film transistors are suitably used for switching devices SW1, SW2, SW3, SW4 . . . SW$_N$. Odd-numbered light-emitting devices OEL1, OEL3, . . . OEL(2N−1) are referred to as a first light-emitting device group, and commonly connected to a gate line G1 through the odd-numbered switching devices SW1, SW3, . . . SW(2N−1), whereas even-numbered light-emitting devices OEL2, OEL4, . . . OEL(2N) are referred to as a second light-emitting device group, and commonly connected to a gate line G2 through the even-numbered switching devices SW2, SW4, . . . SW(2N), wherein N indicates a positive integer. Each pair of adjacent light-emitting devices OEL1–OEL2, OEL3–OEL4, . . . OEL(2N−1)-OEL(2N) are commonly connected to each source terminal of SW1–SW2, SW3–SW4, . . . SW(2N−1)-SW(2N) by each of source lines I$_1$, I$_2$, . . . I$_N$, respectively. The other electrodes of the light-emitting devices OEL1, OEL2, OEL3, OEL4, . . . OEL$_N$ are connected to a common line C$_0$, and thus function as anodes or cathodes of the light-emitting devices OEL1, OEL2, OEL3, OEL4 . . . OEL$_N$.

In a preferred embodiment in accordance with the present invention, sample-and-hold circuits SH1, SH2, SH3, SH4, . . . SH$_N$ intervene between the switching devices SW1, SW2, SW3, SW4, . . . SW$_N$ and the light-emitting devices OEL1, OEL2, OEL3, OEL4, . . . OEL$_N$, respectively. The sample-and-hold circuits SH1, SH2, SH3, SH4, . . . SH$_N$ have capacitors C$_1$, C$_2$, C$_3$, C$_4$, . . . C$_N$, respectively, that are connected to sample-and-hold switching devices whose gates are connected to a common line So. The gate of each sample-and-hold switching device switches on or off at a predetermined interval in synchronism with the rotation of the photosensitive drum. Another electrode of each of the capacitors C$_1$, C$_2$, C$_3$, C$_4$, . . . C$_N$ is set to the ground or a given DC bias voltage V$_G$. The DC bias voltage V$_G$ can be changed in view of the external temperature and the life.

Figure 5:
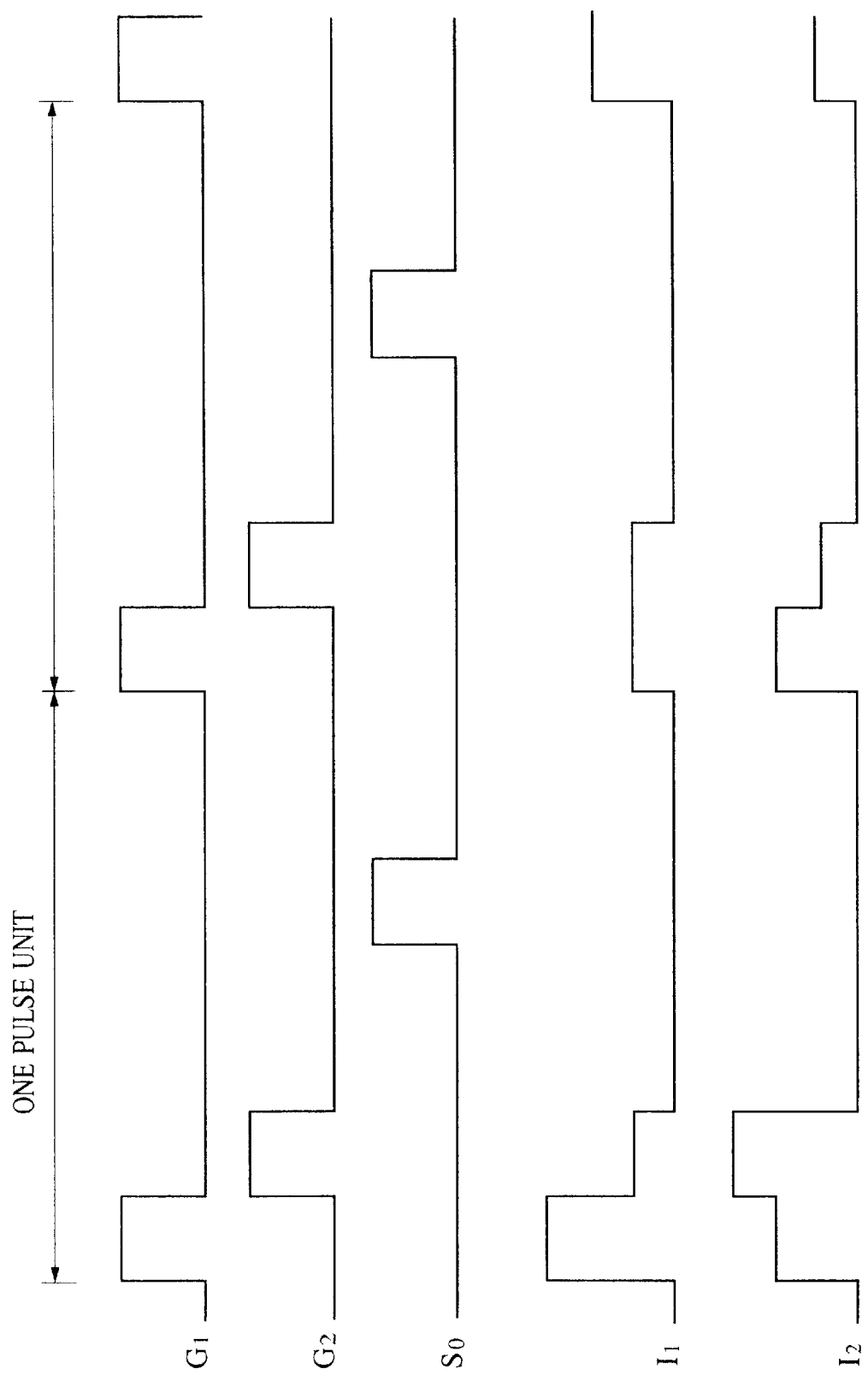
FIG. 5 is a pulse sequence diagram for driving a light-emitting device array in accordance with the present invention.

FIG. 5 is a pulse sequence diagram for driving the active matrix circuit shown in FIG. 4. Pulse sequences having voltages in response to image signals are applied to the source lines I$_1$ and I$_2$ in synchronism with gate-on pulses for the gate lines G$_1$ and G$_2$. The height of the pulse sequence for image signals reflects the gradation of the image density. In a preferable embodiment, the pulse width or the number of pulses can be changed in response to the gradation of the image density. Gate-on pulses are applied to the connecting line So in order to switch on the gates of the sample-and-hold switching devices so that charges held in the capacitors C$_1$, C$_2$, C$_3$, C$_4$, . . . C$_N$ based on the image information are discharged to the light-emitting devices OEL1, OEL2, OEL3, OEL4, . . . OEL$_N$, respectively. The timing of the gate-on pulses is determined so that the gates operate after sufficient amounts of charge are accumulated in the capacitors C$_1$, C$_2$, C$_3$, C$_4$, . . . C$_N$. Instead of the DC pulses shown in FIG. 5, AC pulses may be applied as voltage signals in response to the image signals in the active matrix circuits of the present invention.

Figure 6:
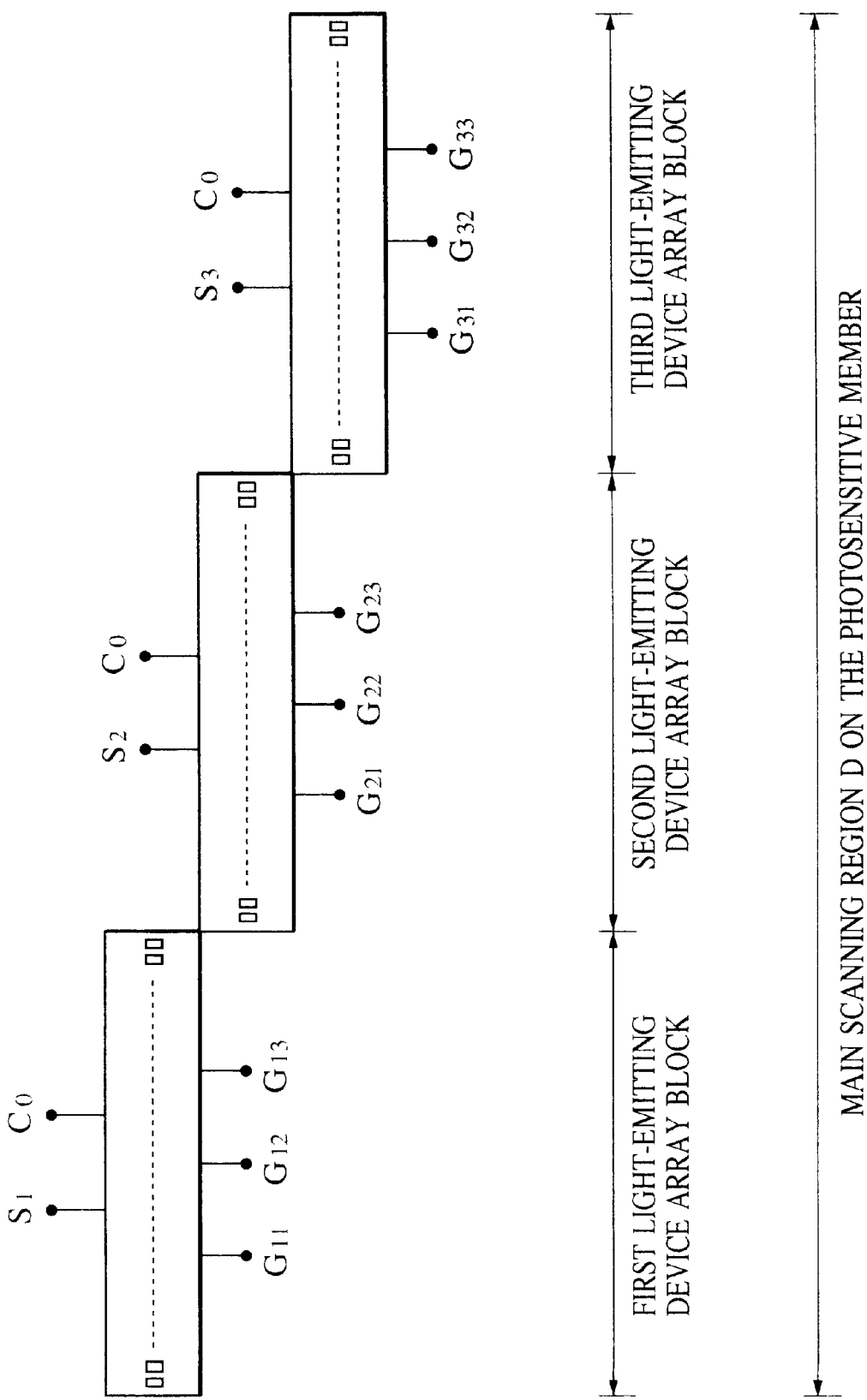
FIG. 6 is a block diagram of another light-emitting device array in accordance with the present invention.

FIG. 6 is a block diagram of a preferred light-emitting device array in accordance with the present invention. This light-emitting device array consists of three blocks, that is, a first light-emitting device array block, a second light-emitting device array block, and a third light-emitting device array block. Each array block has a circuit as shown in FIG. 4. Wiring in this embodiment is of a time division type with a time division number of 3. The first to third blocks have a first gate line group (including gate lines G$_{11}$, G$_{12}$, G$_{13}$), a second gate line group (including gate lines G$_{21}$, G$_{22}$, G$_{23}$), and a third gate line group (including gate lines G$_{31}$, G$_{32}$, G$_{33}$), respectively. Also, the first to third light-emitting device array blocks are provided with connecting lines S$_1$, S$_2$, and S$_3$, respectively, for applying gate-on pulses in order to release charges in the capacitors.

Figure 7:
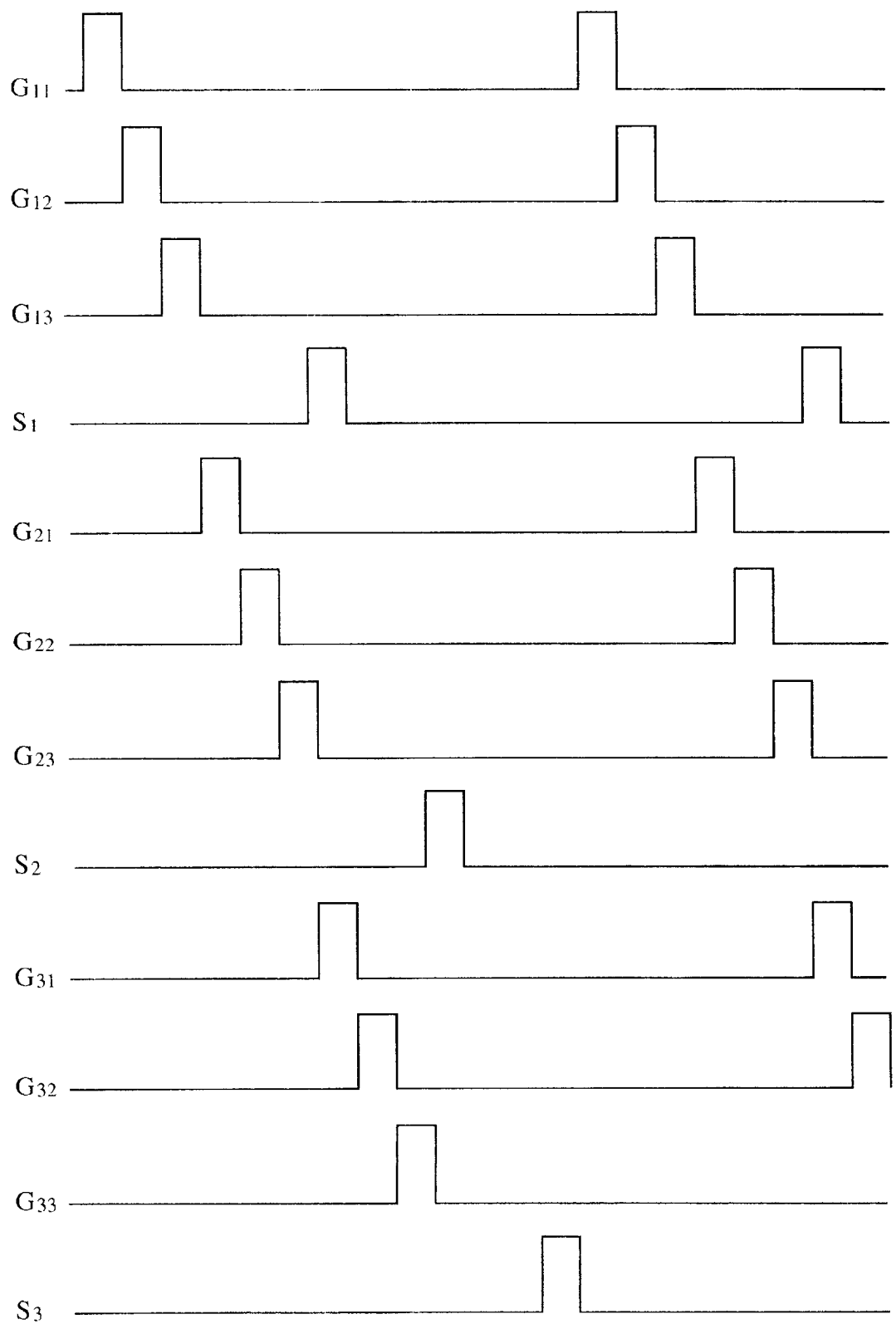
FIG. 7 is a sequence diagram for driving the light-emitting device array shown in FIG. 6.

FIG. 7 is a sequence diagram for driving the light-emitting device array shown in FIG. 6. Gate-on pulses are applied to the first gate line group (including gate lines G$_{11}$, G$_{12}$, G$_{13}$), the second gate line group (including gate lines G$_{21}$, G$_{22}$, G$_{23}$), and the third gate line group (including gate lines G$_{31}$, G$_{32}$, G$_{33}$) to initiate charging into the capacitors, whereas gate-on pulses are applied to the connecting lines S$_1$, S$_2$, and S$_3$ to initiate discharging from the capacitors to the light-emitting devices. As a result, the light-emitting devices in the same block can simultaneously emit light. Although the light-emitting times of these light-emitting devices may partly overlap with each other, it is preferable that the times entirely overlap with each other.

Figure 8:
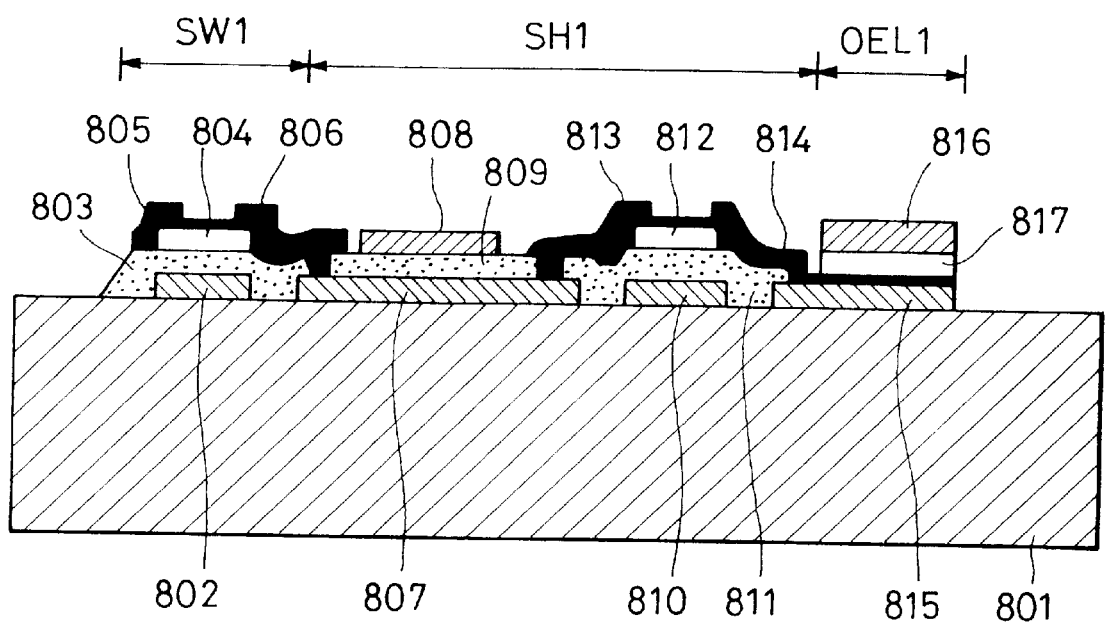
FIG. 8 is a cross-sectional view of a light-emitting device in accordance with the present invention.

FIG. 8 is a cross-sectional view of one bit in the light-emitting device array used in the circuit shown in FIG. 4. The light-emitting device array is formed on a substrate 801 composed of an insulating material, such as glass or plastic. One bit comprises a switching device section SW1, a sample-and-hold circuit SH1, and a light-emitting device section OEL1. The switching device SW1 has a first transistor section including a gate electrode 802, a gate insulating film 803, a semiconductor thin-film 804, a source electrode 805, and a drain electrode 806. The sample-and-hold circuit SH1 has a capacitor section including a pair of electrodes 807 and 808 and an insulating film 809 provided therebetween, and a second transistor section including a gate electrode 810, a gate insulating film 811, a semiconductor thin-film 812, a source electrode 813, and a drain electrode 814. The light-emitting device OEL1 has a pair of electrodes 815 and 816 and a light-emitting layer 817 provided therebetween.

The semiconductor thin-films 804 and 812 of the first and second transistor sections may be composed of amorphous silicon, polycrystalline silicon, or single-crystal silicon. The gate insulating films 803 and 811 may be composed of silicon nitride or tantalum oxide. One of the electrodes of the light-emitting device OEL1 is an anode and the other is a cathode. The electrode at the light-emitting side is preferably composed of a transparent conductive film formed of indium tin oxide (ITO) or tin oxide, whereas the other electrode is preferably composed of a reflective metal film formed of aluminum, silver, zinc, gold, or chromium.

In the present invention, the light-emitting layer is preferably covered with a sealing material to prevent deterioration of the light-emitting layer. Examples of sealing materials used in the present invention include inorganic insulating materials such as silicon oxide and silicon nitride, and organic insulating materials such as epoxy resins. The light-emitting layer 817 preferably used in the present invention is composed of an organic electroluminescent (OEL) material. Also, an inorganic electroluminescent material may be used in the present invention.

OEL Materials used in the present invention are disclosed by Scozzafava, EPA 349,265 (1990) and U.S. Pat. No. 6,073,446; by Tang, U.S. Pat. Nos. 4,356,429, 4,769,292, 4,885,211, 5,294,869, and 5,294,870; by VanSlyke et al., U.S. Pat. Nos. 4,539,507, 4,720,432, 5,047,687, 5,059,862, 5,061,617, and 5,151,629; by Perry, U.S. Pat. No. 4,950,950; and by Littman, U.S. Pat. No. 5,059,861.

The electroluminescent layer comprises an organic hole injection/transport zone being in contact with the anode, and an electron injection/transport zone being in contact with the organic hole injection/transport zone. The organic hole injection/transport zone may be formed of a single material or plural materials, and has a hole injection layer and a continuous hole transport layer provided between the hole injection layer and the electron injection/transport zone. Similarly, the electron injection/transport zone may be formed of a single material or plural materials, and has an electron injection layer and a continuous electron transport layer provided between the electron injection layer and the hole injection/transport zone. Owing to the recombination of holes with electrons, luminescence occurs, in the electron injection/transport zone, near the junction with the hole injection/transport zone. The OEL layer is generally formed by a vapor deposition process or may be formed by any other process.

Organic compounds for the hole-injection layer are represented by the following formula:

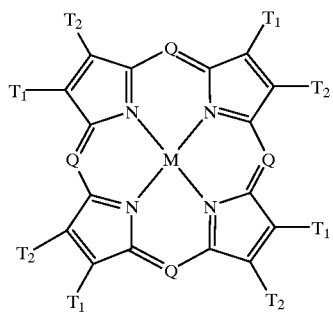

wherein Q is nitrogen or C—R, wherein R is alkyl, such as methyl or ethyl; M is a metal, metal oxide or metal halide; T1 and T2 are each hydrogen or form an unsaturated 6-member ring containing substituted groups such as, halogen, alkyl having 1 to 6 carbon atoms, and aryl, e.g. phenyl.

In preferable embodiments, materials for the hole transport layer are aromatic tertiary amines, and particularly, tetraaryldiamines represented by the following formula:

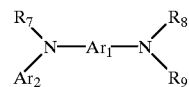

wherein $Ar_1$ is arylene having repeating units n of 1 to 4; and $Ar_2$, $R_7$, $R_8$, and $R_9$ are each aryl. In preferable embodiments, the luminescent, electron injection/transport zone contains a metal oxinoid. Preferable metal oxinoids are represented by the following general formula:

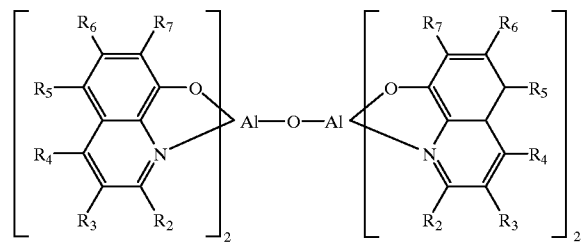

wherein $R_2$ to $R_7$ are each hydrogen or a substituent. Other preferable metal oxinoids are represented by the following formula:

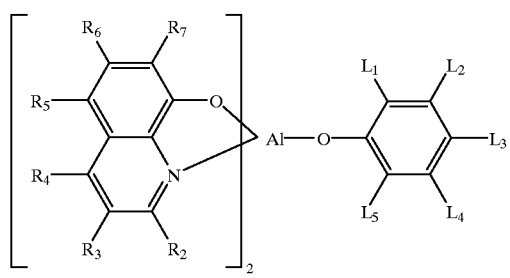

wherein $R_2$ to $R_7$ are the same as those defined in the former formula, $L_1$ to $L_5$ contain not greater than 13 carbon atoms in total and are each hydrogen or a substituent containing 1 to 12 carbon atoms, and $L_1$ and $L_2$ or $L_2$ to $L_3$ may combine together to form a 6-member ring. Also, metal oxinoids represented by the following formula are preferred:

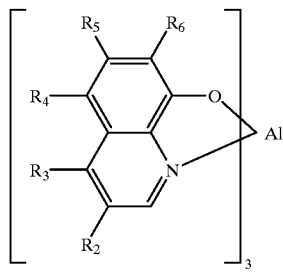

wherein $R_2$ to $R_6$ are each hydrogen or a substituent. In the present invention, materials for the electroluminescent layer are not limited to these exemplary materials. Any other organic materials can also be used in the electroluminescent layer. The organic electroluminescent materials are coordination compounds having organic ligands, as described above.

The segment electrode of the electroluminescent device of the present invention may be composed of a reflective metal film of aluminum, silver, zinc, gold, or chromium. The counter electrode may be composed of a transparent conductive film of indium tin oxide or tin oxide. The sealing material may be composed of an inorganic insulating material, for example, silicon oxide or silicon nitride, or an organic insulating resin such as an epoxy resin. The protective layer may be composed of an inorganic insulating material, e.g. silicon oxide or silicon nitride, or an organic insulating resin, e.g. an epoxy resin.

In the image-forming apparatus of the present invention, as shown in FIG. 1, materials for the photosensitive layers of photosensitive members 1a, 1b, 1c and 1d include organic photoconductive compounds, e.g. benzooxazole photosensitive compounds, benzothiazole photosensitive compounds, and triphenylamine photosensitive compounds; and inorganic photoconductive compounds, e.g. amorphous silicon (a—Si), amorphous silicon-germanium alloys (a—SiGe), and amorphous silicon-carbon alloys (a—SiC).

A silicon nitride protective film with a thickness of approximately 150 nm is generally formed on the device by a sputtering process. The layers from the organic layer to the protective layer can be deposited in the same vacuum system.

It is preferable that the anode for the organic LED be composed of a material having a large work function. Examples of such materials include ITO, tin oxide, gold, platinum, palladium, selenium, iridium, and copper iodide. In contrast, the cathode is preferably composed of a material having a small work function. Examples of such materials include Mg/Ag, Mg, Al, Si, In and alloys thereof.

Examples of materials for the hole transport layer include N,N'-di(3-tolyl)-N,N'-diphenyl-4,4'-diaminobenzene (TPD); organic compounds listed below; and inorganic compounds such as a—Si and a—SiC.

HOLE TRANSPORT COMPOUNDS

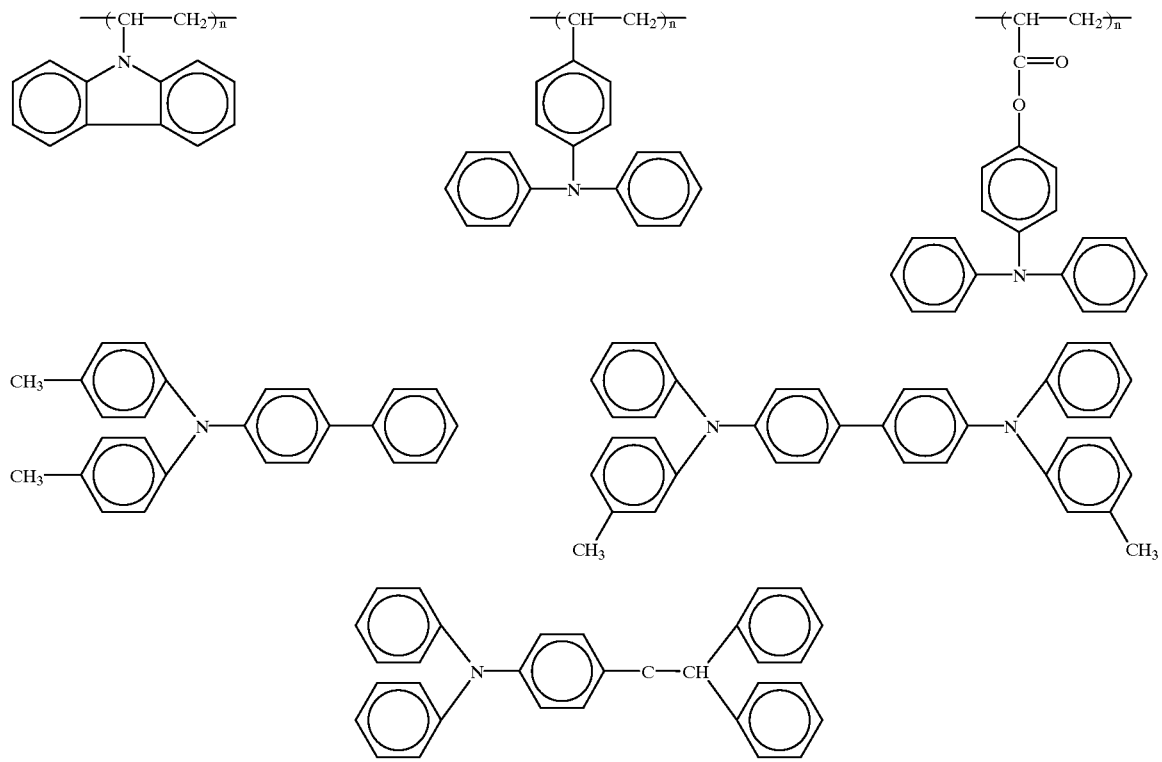

-continued
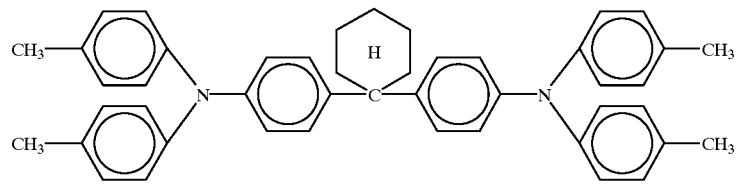
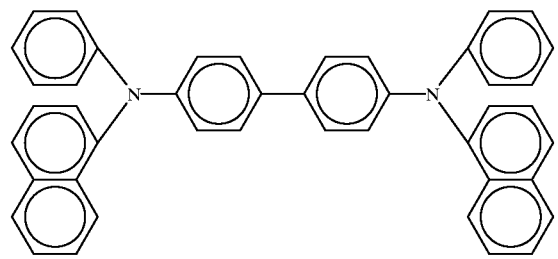
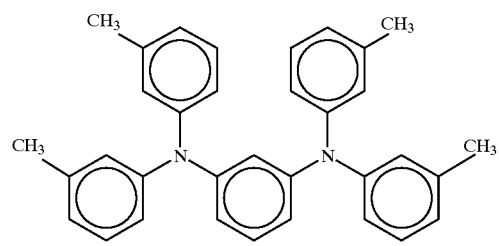
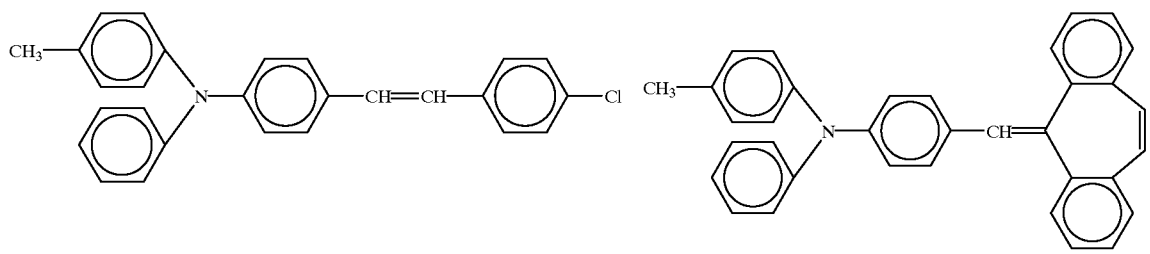
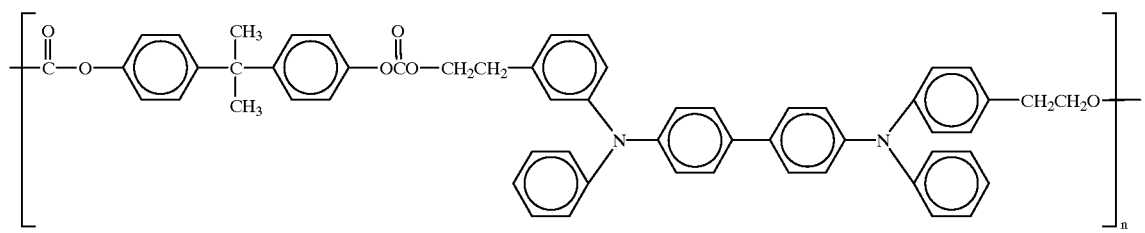
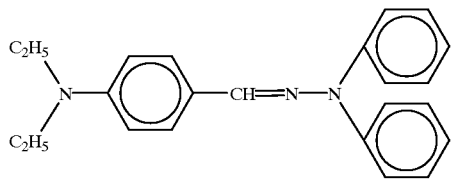
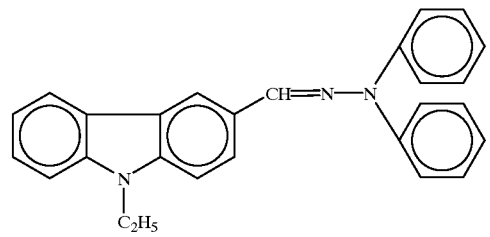
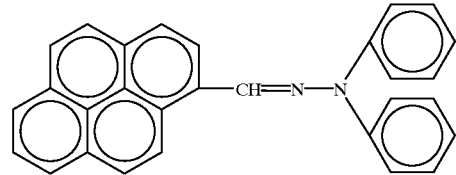
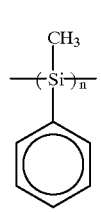
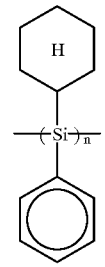
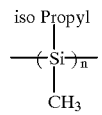

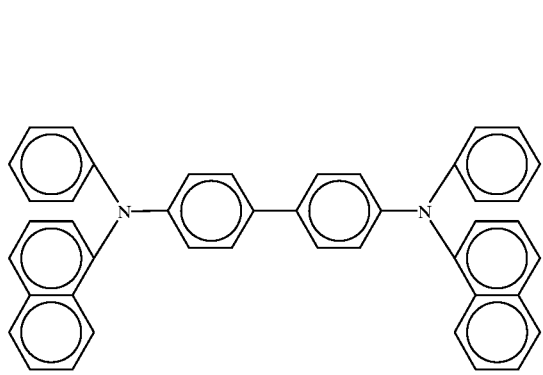
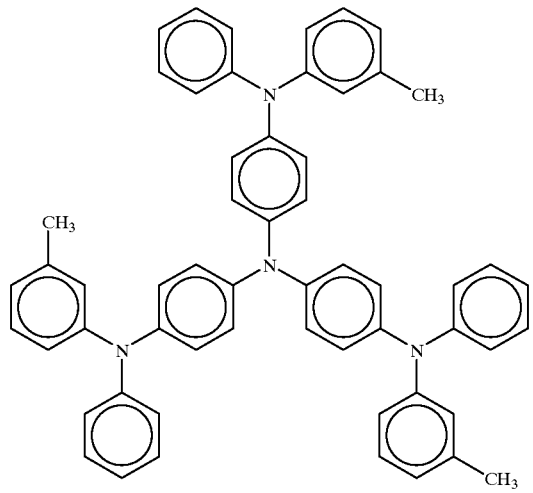
Examples of materials used for the electron transport layer include aluminum tris(8-hydroxyquinoline) (Alq$_3$) and compounds listed below:
ELECTRON TRANSPORT COMPOUNDS
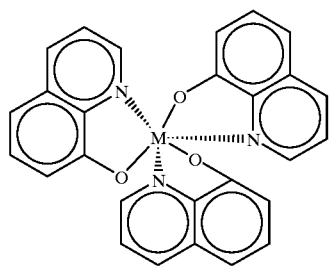
M: Al, Ga
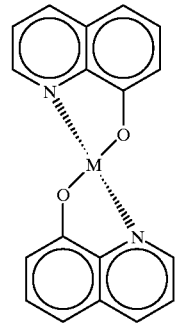
M: Zn, Mg, Be
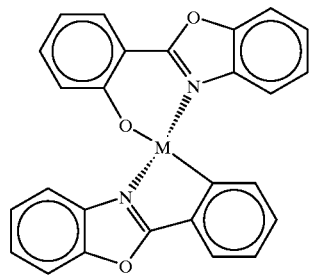
M: Zn, Mg, Be
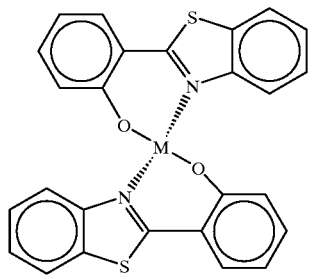
M: Zn, Mg, Be
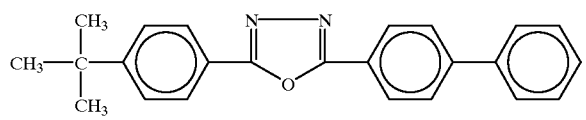

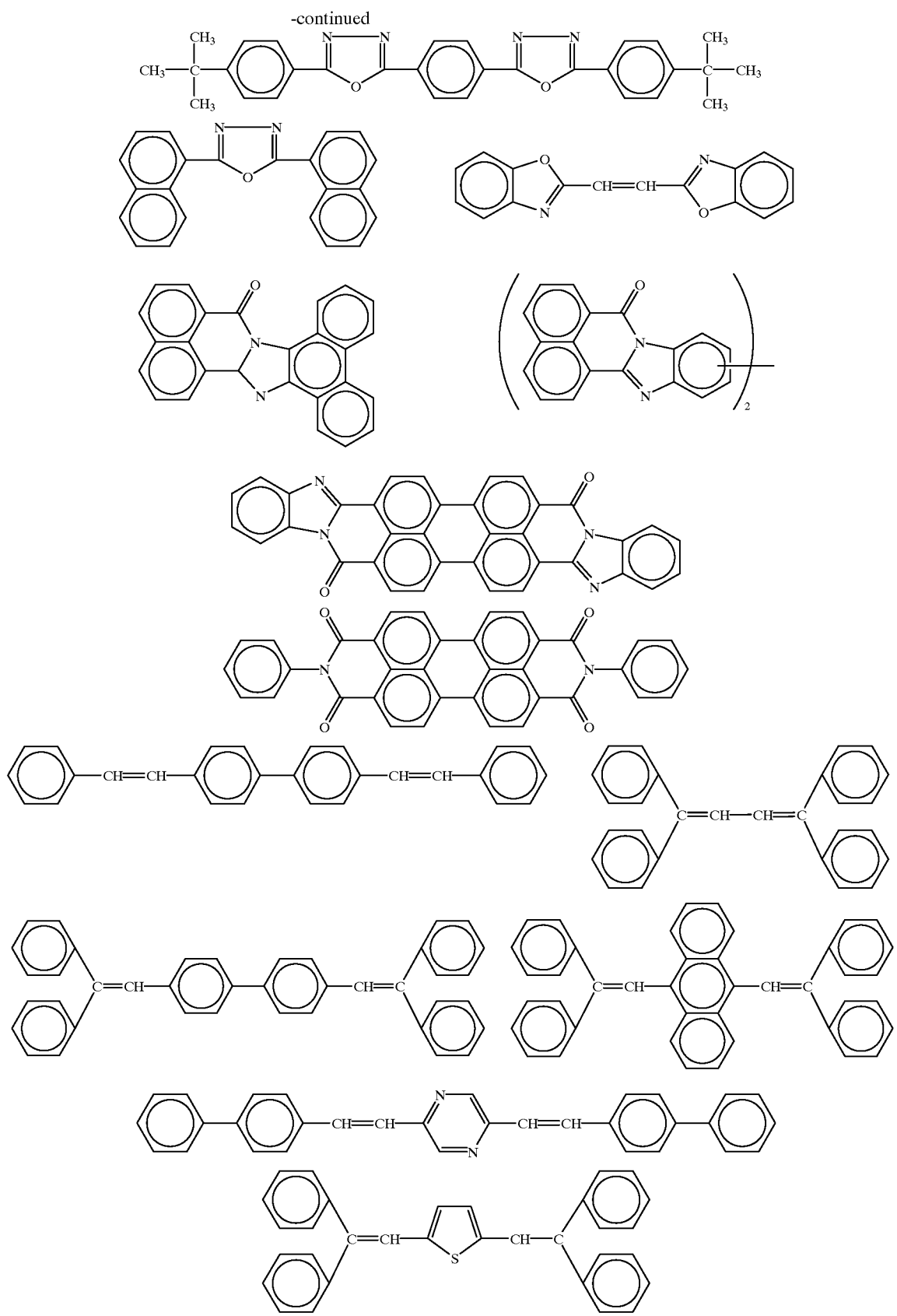

The hole transport layer and/or the electron transport layer may be doped with a colorant such as a dye or pigment. Examples of dopants are listed below.

DOPANT DYES

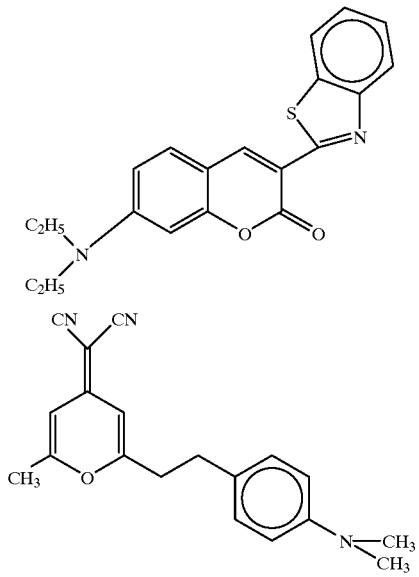

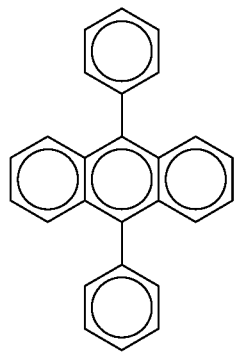

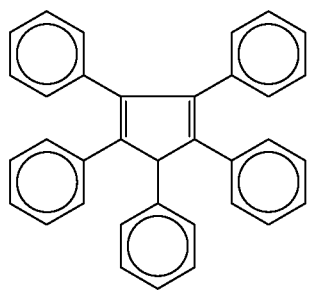

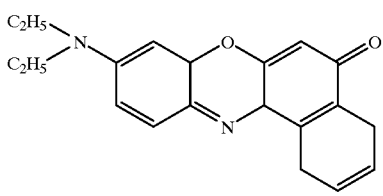

-continued

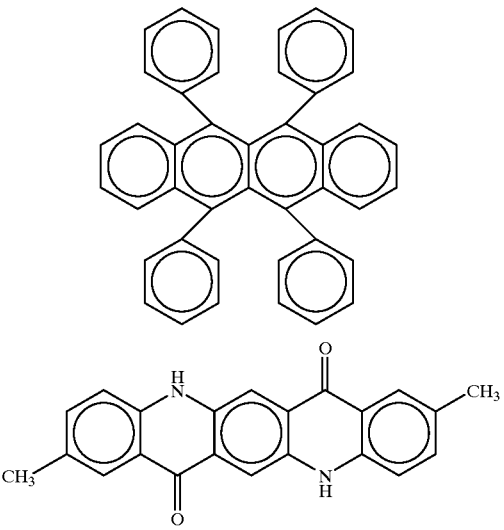

It is preferable that the compounds having high luminescent spectra with respect to the primary colors be selected as the organic LED materials for the photosensitive drums.

Figure 9:
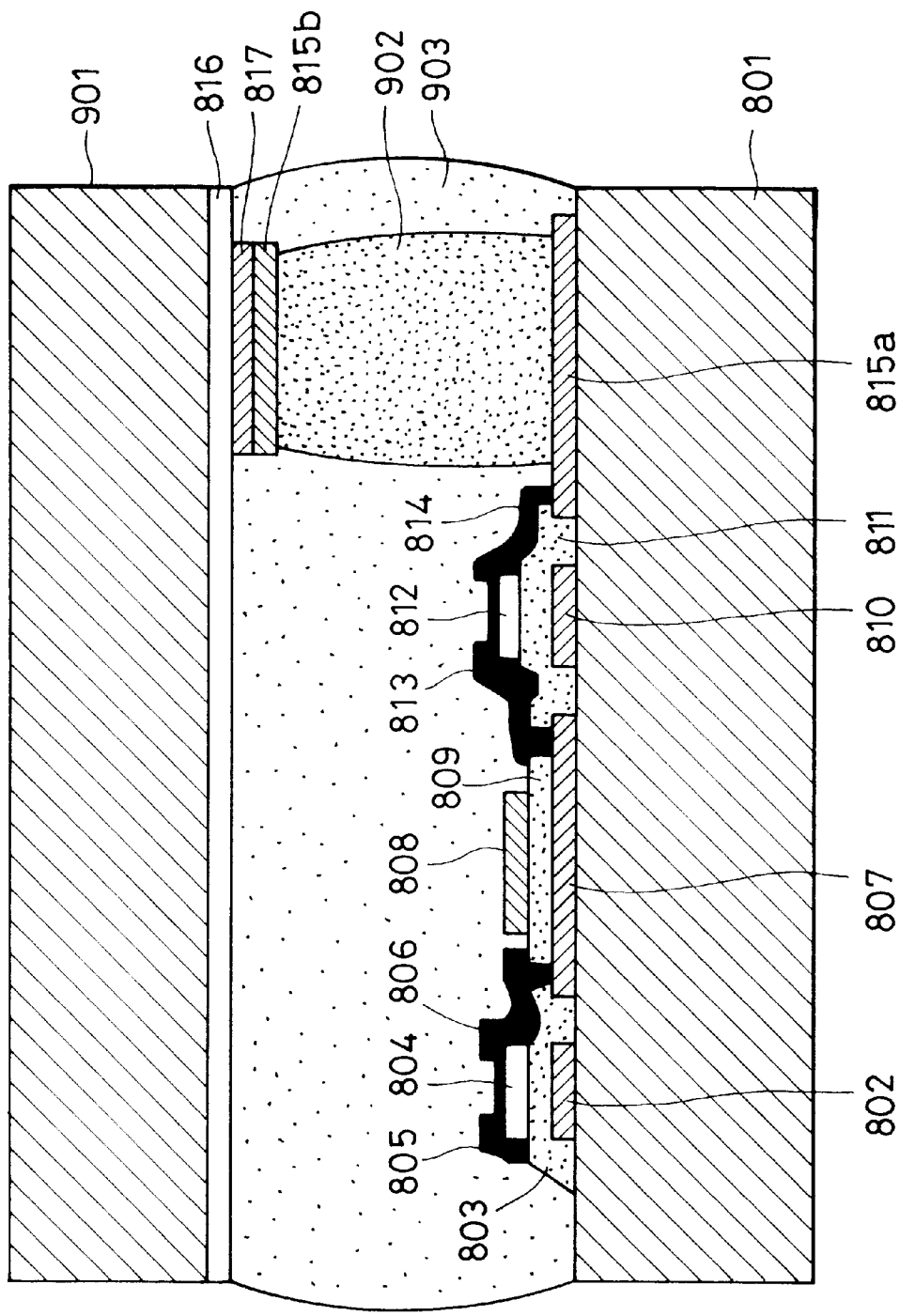
FIG. 9 is a cross-sectional view of another light-emitting device in accordance with the present invention.

FIG. 9 is a cross-sectional view of another preferable embodiment of the light-emitting device in accordance with the present invention. A switching device and a sample-and-hold circuit, which are the same as those shown in FIG. 8, are provided on a lower substrate 801, whereas a light-emitting section including a pair of electrodes 816 and 815b and a luminescent layer 817 thereon is provided on an upper substrate 901 composed of an insulating material such as glass. The two substrates 801 and 901 face each other so that their electrodes 815a and 815b are arranged between the substrates 801 and 901. The electrodes 815a and 815b are connected to each other by conductive connection 902.

The conductive connection 902 is formed of a conductive adhesive composed of an epoxy or phenol thermosetting resin and a conductive particulate filler, such as a silver or copper filament. Typical examples of epoxy thermosetting resin include Epikote (Trade name, made by Shell Chemical Corp.), Araldite (Trade name, made by Ciba Ltd.) and Scotchcast (Trade name, made by 3M Co.). Typical Examples of phenol thermosetting resin include Textolite (Trade name, made by General Electric Co.) and Resinox (Trade name, made by MonSanto Chemical Co.). The conductive adhesive is applied and dried on predetermined positions of the upper substrate 901 and/or the lower substrate 801 by a screen printing process, an offset printing process, or a dispenser coating process. The conductive adhesive may contain a silane-coupling agent to enhance adhesiveness at the interface. Examples of silane-coupling agents include N-(2-aminoethyl)-3-aminopropylmethyldimethoxysilane, N-(2-aminoethyl)-3-aminopropylmethyltrimethoxysilane, 3-aminopropylmethyldiethoxysilane, and 3-glycidoxypropyltrimethoxysilane. Solder may also be used as another embodiment of the conductive connection 902.

The space between the substrates 801 and 901 including the peripheral section of the conductive connection 902 is filled with an insulating material 903. The insulating material 903 is generally composed of an epoxy or phenol insulating adhesive, and applied on the predetermined positions of the upper substrate 901 and/or the lower substrate 801 by an offset printing process, a screen printing process or a dispenser coating process.

In a preferable embodiment of coating of the insulating adhesive and the conductive adhesive, one of the insulating adhesive and the conductive adhesive is applied on one of the substrates, and the other adhesive is applied on the other substrate. The insulating material 903 may be replaced with an insulating liquid not having adhesiveness. Examples of such insulating liquids include organic solvents, especially high boiling-point organic solvents, and liquid crystals, such as nematic liquid crystals, cholesteric liquid crystals, and smectic liquid crystals. The insulating material 903 may contain a color pigment or dye, if light shielding characteristics are necessary.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image forming apparatus comprising:

a photosensitive member;

a light-emitting means; said light-emitting means comprising: a light-emitting device array including a plurality of light-emitting devices arranged in the main scanning direction to the moving direction of the photosensitive member; a first transistor array including a plurality of first transistors respectively connected to the light-emitting devices at first terminals of said first transistors, said first transistor array being divided into a plurality of groups comprised of a plurality of transistors; a first line group comprised of a first line connecting commonly to third terminals of each transistor of a first transistor group and a second line connecting commonly to third terminals of each transistor of a second transistor group of said plurality of the divided transistor groups; a second line group comprised of a plurality of lines connecting commonly second terminals of said first transistor and said second transistor of said first transistor group to second terminals of said first transistor and said second transistor of said second transistor group; a capacitor connected to each of the first terminal of said plurality of first transistors respectively, and accumulating electric signals from said second line group; a second transistor array including a plurality of second transistors arranged in a line connecting a capacitor with light-emitting devices by first terminals and second terminals; and a third line connecting commonly third terminals of second transistors, wherein the first, second and third terminals of said first and second transistors are drain terminals, source terminals and gate terminals, respectively; and a driving means for driving said light-emitting circuit, applying scanning signals sequentially to said first line group, whereby third terminals of first transistors on the lines applied by said scanning signals are switched on, during which condition third terminals of second transistors are switched off by the third line, and a voltage signal is applied to the second line group in response to an image signal, whereby third terminals of second transistors are switched on by the third line after said voltage signal is charged and accumulated in a capacitor, whereby electric signal held in said capacitor is discharged to the light-emitting devices simultaneously.

2. An image forming apparatus according to claim 1, wherein said light-emitting device has an organic light-emitting layer.

3. An image forming apparatus according to claim 1, wherein said photosensitive member is an electrophotographic photosensitive member.

4. An image forming apparatus according to claim 3, wherein said electrophotographic photosensitive member is an organic electrophotographic photosensitive member.

5. An image forming apparatus according to claim 3, wherein said electrophotographic photosensitive member is an inorganic electrophotographic photosensitive member.

6. An image forming apparatus according to claim 5, wherein said inorganic electrophotographic photosensitive member comprises amorphous silicon.

7. An image forming apparatus according to claim 1, wherein said switching devices are thin film transistors, said first terminal is a gate terminal, and said second terminal is a source terminal.

8. An image forming apparatus according to claim 1, wherein said switching device array is a single chip.

9. An image forming apparatus according to claim 1 comprising: a plurality of blocks of light-emitting device arrays, said each light-emitting device array block including said light-emitting circuit and driving means; and a driving means for operating sequentially said light-emitting device array blocks.

\* \* \* \* \*

UNITED STATES PATENT AND TRADEMARK OFFICE
CERTIFICATE OF CORRECTION

PATENT NO.    : 6,188,420 B1  
DATED         : February 13, 2001  
INVENTOR(S)   : Masaki Kuribayashi et al.

It is certified that error appears in the above-identified patent and that said Letters Patent is hereby corrected as shown below:

Column 2,  
Line 23, "groups" should read -- groups; --.

Column 5,  
Line 25, "arrays 200 *a*" should read -- arrays 200*a*, --;  
Line 30, "arrays 200 *a*" should read -- arrays 200*a*, --;

Column 6,  
Line 15, "line So." should read -- line $S_O$. --;  
Line 31, "line So." should read -- line $S_O$. --;

Column 16,  
Line 60, "CH—C" should read -- CH=C --.

Column 17,  
Line 23, " 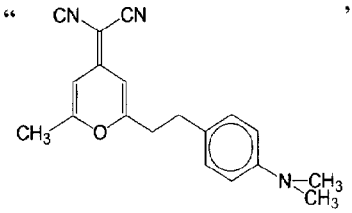 " should read -- 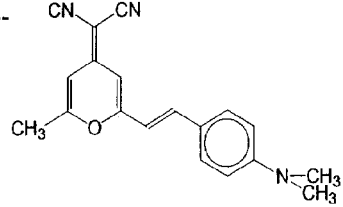 --

Column 19,  
Line 46, "terminal" should read -- terminals --.

Signed and Sealed this

Eighteenth Day of June, 2002

*Attest:*

JAMES E. ROGAN  
*Director of the United States Patent and Trademark Office*

*Attesting Officer*